United States Patent
Moghaddam Sardroud et al.

(10) Patent No.: US 12,417,018 B2
(45) Date of Patent: Sep. 16, 2025

(54) METHOD AND APPARATUS FOR TRAINING DATA COMPRESSION MODEL, AND STORAGE MEDIUM

(71) Applicant: SHENZHEN ZHI HUI LIN NETWORK TECHNOLOGY CO., LTD., Shenzhen Guangdong (CN)

(72) Inventors: Behzad Moghaddam Sardroud, Shenzhen Guangdong (CN); Behzad Kalantari, Shenzhen Guangdong (CN); Hamed Kalantari, Shenzhen Guangdong (CN); Kun Huang, Shenzhen Guangdong (CN); Yan Yin, Shenzhen Guangdong (CN)

(73) Assignee: SHENZHEN ZHI HUI LIN NETWORK TECHNOLOGY CO., LTD., Shenzhen Guangdong (CN)

( * ) Notice: Subject to any disclaimer, the term of this patent is extended or adjusted under 35 U.S.C. 154(b) by 0 days.

(21) Appl. No.: 18/579,660

(22) PCT Filed: Jul. 15, 2022

(86) PCT No.: PCT/CN2022/105929
§ 371 (c)(1),
(2) Date: Jan. 16, 2024

(87) PCT Pub. No.: WO2023/284851
PCT Pub. Date: Jan. 19, 2023

(65) Prior Publication Data
US 2024/0329835 A1   Oct. 3, 2024

(30) Foreign Application Priority Data
Jul. 16, 2021  (CN) .................. 202110812042.5

(51) Int. Cl.
G06F 3/06  (2006.01)

(52) U.S. Cl.
CPC .......... *G06F 3/0608* (2013.01); *G06F 3/0652* (2013.01); *G06F 3/0655* (2013.01); *G06F 3/0673* (2013.01)

(58) Field of Classification Search
CPC .... G06F 3/0608; G06F 3/0652; G06F 3/0655; G06F 3/0673; G06F 3/0604; G06F 3/064; G06F 3/0671; Y02D 10/00
See application file for complete search history.

(56) References Cited

U.S. PATENT DOCUMENTS

| | | | |
|---|---|---|---|
| 5,764,357 A | 6/1998 | Dockser | |
| 6,348,881 B1 * | 2/2002 | Buer | H03M 7/3084 375/240 |

(Continued)

FOREIGN PATENT DOCUMENTS

| | | |
|---|---|---|
| CN | 1666196 A | 9/2005 |
| CN | 102831245 A | 12/2012 |

(Continued)

OTHER PUBLICATIONS

Wikipedia, "Error correction code", Dec. 1, 2019, pp. 1-11, https://en.wikipedia.org/w/index.php?title=Error_correction_code&oldid=928730614 (Year: 2019).*

(Continued)

*Primary Examiner* — Christopher D Birkhimer
(74) *Attorney, Agent, or Firm* — Scully, Scott, Murphy & Presser, P.C.

(57) ABSTRACT

A method and an apparatus for training a data compression model, and a storage medium are provided. The method includes: reading a data block with a predefined size; analyzing a possibility of adding redundancy in the data block; determining an index of a function for generating (Continued)

redundant data in the data block; and generating, with the function corresponding to the index, redundant data in the data block.

18 Claims, 5 Drawing Sheets

(56) References Cited

U.S. PATENT DOCUMENTS

| | | | | |
|---|---|---|---|---|
| 7,079,051 | B2* | 7/2006 | Storer | H03M 7/30 341/51 |
| 8,429,359 | B1* | 4/2013 | Desai | G06F 11/1461 711/E12.103 |
| 8,538,919 | B1* | 9/2013 | Nielsen | H04L 63/0272 718/1 |
| 8,593,678 | B2* | 11/2013 | Ohishi | H04N 1/2166 358/1.15 |
| 9,075,705 | B2* | 7/2015 | Hikichi | G06F 11/004 |
| 9,092,182 | B2* | 7/2015 | Ohishi | H04N 1/00944 |
| 9,344,596 | B2* | 5/2016 | Ohishi | H04N 1/00973 |
| 9,800,291 | B1* | 10/2017 | Ben David | G06F 11/1415 |
| 10,198,310 | B1* | 2/2019 | Zhu | G06F 11/1008 |
| 10,664,165 | B1* | 5/2020 | Faibish | G06F 3/0638 |
| 11,704,043 | B1* | 7/2023 | Throgmorton | G06F 11/1469 711/162 |
| 2003/0065656 | A1 | 4/2003 | de la Torre et al. | |
| 2003/0196023 | A1 | 10/2003 | Dickson | |
| 2004/0117414 | A1* | 6/2004 | Braun | G06F 8/65 |
| 2005/0138522 | A1* | 6/2005 | Silvus | H03M 5/145 714/758 |
| 2006/0005074 | A1* | 1/2006 | Yanai | G06F 11/2066 714/6.32 |
| 2007/0136636 | A1* | 6/2007 | Tsai | H03M 13/2906 714/752 |
| 2008/0055331 | A1 | 3/2008 | Iourcha et al. | |
| 2008/0140902 | A1* | 6/2008 | Townsend | H04B 1/0475 710/306 |
| 2008/0307020 | A1* | 12/2008 | Ko | G06F 21/6245 |
| 2009/0022219 | A1* | 1/2009 | Goel | H04N 19/176 375/E7.081 |
| 2009/0041230 | A1* | 2/2009 | Williams | G06F 11/1448 707/999.204 |
| 2009/0077445 | A1* | 3/2009 | Honda | G06F 21/78 714/752 |
| 2011/0041036 | A1* | 2/2011 | Ootsuka | G06F 11/1048 714/E11.03 |
| 2011/0161784 | A1* | 6/2011 | Selinger | G06F 11/1016 714/E11.002 |
| 2011/0236049 | A1* | 9/2011 | Haga | G03G 15/5004 399/75 |
| 2012/0117325 | A1* | 5/2012 | Chen | H04L 67/568 711/E12.001 |
| 2012/0224777 | A1* | 9/2012 | Kim | H04N 19/196 382/238 |
| 2013/0024423 | A1* | 1/2013 | Doshi | G06F 11/1448 707/640 |
| 2013/0166861 | A1* | 6/2013 | Takano | G06F 3/064 711/161 |
| 2013/0173554 | A1* | 7/2013 | Ubukata | G06F 11/2094 707/640 |
| 2014/0049413 | A1* | 2/2014 | Agarwal | H03M 7/30 341/87 |
| 2014/0143517 | A1* | 5/2014 | Jin | G06F 12/023 711/171 |
| 2014/0219001 | A1* | 8/2014 | Patapoutian | G11C 13/0033 365/148 |
| 2014/0254687 | A1* | 9/2014 | Kondo | H04N 19/513 375/240.16 |
| 2015/0025656 | A1* | 1/2015 | Ono | G05B 19/052 700/20 |
| 2016/0070616 | A1* | 3/2016 | Tavallaei | G06F 3/064 714/766 |
| 2016/0196076 | A1* | 7/2016 | Oh | G11C 16/26 711/103 |
| 2016/0196216 | A1* | 7/2016 | Lee | G06F 3/0631 711/170 |
| 2016/0352357 | A1* | 12/2016 | Saliba | H03M 13/616 |
| 2017/0094283 | A1* | 3/2017 | Zhang | H04N 19/172 |
| 2017/0132082 | A1* | 5/2017 | Resch | G06F 11/1076 |
| 2017/0132086 | A1* | 5/2017 | Blackburn | G06F 11/1466 |
| 2017/0286220 | A1* | 10/2017 | Gerhard | G06F 11/1096 |
| 2018/0011642 | A1* | 1/2018 | Koseki | G06F 11/1076 |
| 2018/0088811 | A1* | 3/2018 | Kanno | G06F 3/0604 |
| 2018/0095674 | A1* | 4/2018 | Alameldeen | G06F 3/064 |
| 2018/0138921 | A1* | 5/2018 | Arelakis | H03M 7/3071 |
| 2018/0275894 | A1* | 9/2018 | Yoshino | G06F 3/0689 |
| 2019/0205035 | A1* | 7/2019 | Mizushima | G06F 12/04 |
| 2020/0293219 | A1 | 9/2020 | Szczepanik et al. | |
| 2020/0310659 | A1* | 10/2020 | Kannan | G06F 3/0688 |
| 2021/0036714 | A1* | 2/2021 | Martin | G06F 13/1668 |
| 2021/0232323 | A1* | 7/2021 | Kannan | G06F 3/0688 |
| 2021/0304441 | A1* | 9/2021 | Yang | H04N 19/176 |
| 2022/0385304 | A1* | 12/2022 | Miki | H03M 13/152 |
| 2023/0112692 | A1* | 4/2023 | Richard | G06F 3/0604 711/154 |
| 2023/0224082 | A1* | 7/2023 | Wang | H04L 1/0041 |

FOREIGN PATENT DOCUMENTS

| | | |
|---|---|---|
| CN | 112506880 A | 3/2021 |
| CN | 112994701 A | 6/2021 |
| CN | 113055017 A | 6/2021 |

OTHER PUBLICATIONS

Chin-Lung Su et al., "An Integrated ECC and Redundancy Repair Scheme for Memory Reliability Enhancement", 2005, pp. 1-9, https://ieeexplore.ieee.org/stamp/stamp.jsp?tp=&arnumber=1544506 (Year: 2005).*

Anonymous, "Error-correcting code", May 2, 2020, pp. 1-8, https://www.jameswhanlon.com/error-correcting-codes.html (Year: 2020).*

International Search Report dated Sep. 29, 2022 issued in PCT/CN2022/105929.

Chinese First Office Action dated May 31, 2023 issued in CN 202110812042.5.

Notice of allowance dated Jul. 6, 2023 issued in CN 202110812042.5.

* cited by examiner

METHOD AND APPARATUS FOR TRAINING DATA COMPRESSION MODEL, AND STORAGE MEDIUM

CROSS-REFERENCE TO RELATED APPLICATION(S)

This application is a National Stage of International Application No. PCT/CN2022/105929, field Jul. 15, 2022, which claims priority to Chinese Patent Application No. 202110812042.5, filed Jul. 16, 2021, the entire disclosures of each of which are hereby incorporated by reference.

TECHNICAL FIELD

This application relates to the field of data processing technology, and particularly to a method and an apparatus for training a data compression model, and a storage medium.

BACKGROUND

Existing compression technologies are algorithms derived from traditional information theory. This causes compression, especially lossless compression, essentially about finding and removing redundant data in files. Traditional compression algorithms, even new ones leveraging artificial intelligence (AI) and machine learning (ML), focus on redundancy. The more redundancy found, the better a compression ratio is.

For example, Huffman algorithm and run-length algorithm tend to find pure redundancy, which means that these algorithms tend to notice a piece of data (e.g., features of text), so that a large amount of replicated data that is exactly the same as the piece of data can be found in a larger piece of data as much as possible. These algorithms perform well to some extent, but the main problem is that the development of these algorithms hit a bottleneck in terms of compression, and all those redundancy-based algorithms fail to discover new ways of generating redundancy.

Existing methods are based on removing or reducing redundancy present in selected data blocks. In addition to focusing on redundancy that exists rather than creating more redundancy, the essence of the problem of the traditional compression algorithms is that they all consider data blocks with a fixed size or a certain variable size, or consider all data blocks (a large amount of data blocks) contained in only one file. Moreover, most traditional compression algorithms only check redundancy in small data blocks, which are exponents of 2 (i.e., 4, 8, 16, 32, 63, 128, 256 bytes).

However, relying only on finding existing redundancy in a small piece of data limits the performance of these traditional compression algorithms.

SUMMARY

In a first aspect, a method for training a data compression model is provided. The method is performed by a processor and includes: reading a data block with a predefined size; analyzing a possibility of adding redundancy in the data block; determining an index of a function for generating redundant data in the data block; and generating, with the function corresponding to the index, redundant data in the data block.

In a second aspect, an apparatus for training a data compression model is provided. The apparatus includes a memory, a processor, and computer programs. The processor is coupled with the memory. The computer programs are stored in the memory and executable on the processor. The computer programs, when executed by the processor, are operable to execute the method in the first aspect.

In a third aspect, a non-transitory computer-readable storage medium is provided. The computer-readable storage medium stores computer programs which, when executed by a processor, cause the processor to execute the method in the first aspect.

BRIEF DESCRIPTION OF THE DRAWINGS

In order to describe technical solutions of implementations of the disclosure or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

DETAILED DESCRIPTION

Hereinafter, technical solutions of implementations of the disclosure will be described clearly and completely with reference to accompanying drawings in the implementations. Apparently, implementations described below are merely some implementations, rather than all implementations of the disclosure. All other implementations obtained by those of ordinary skill in the art based on the implementations without creative efforts shall fall within the protection scope of the disclosure.

The disclosure provides a solution for training data compression model. Different from traditional compression algorithms that directly address redundant data, by analyzing the possibility of adding redundancy in the data block and generating redundant data in the data block with a corresponding compression algorithm, a compression ratio that exceeds an existing possibility can be obtained, and the compression performance can be improved.

Figure 1:
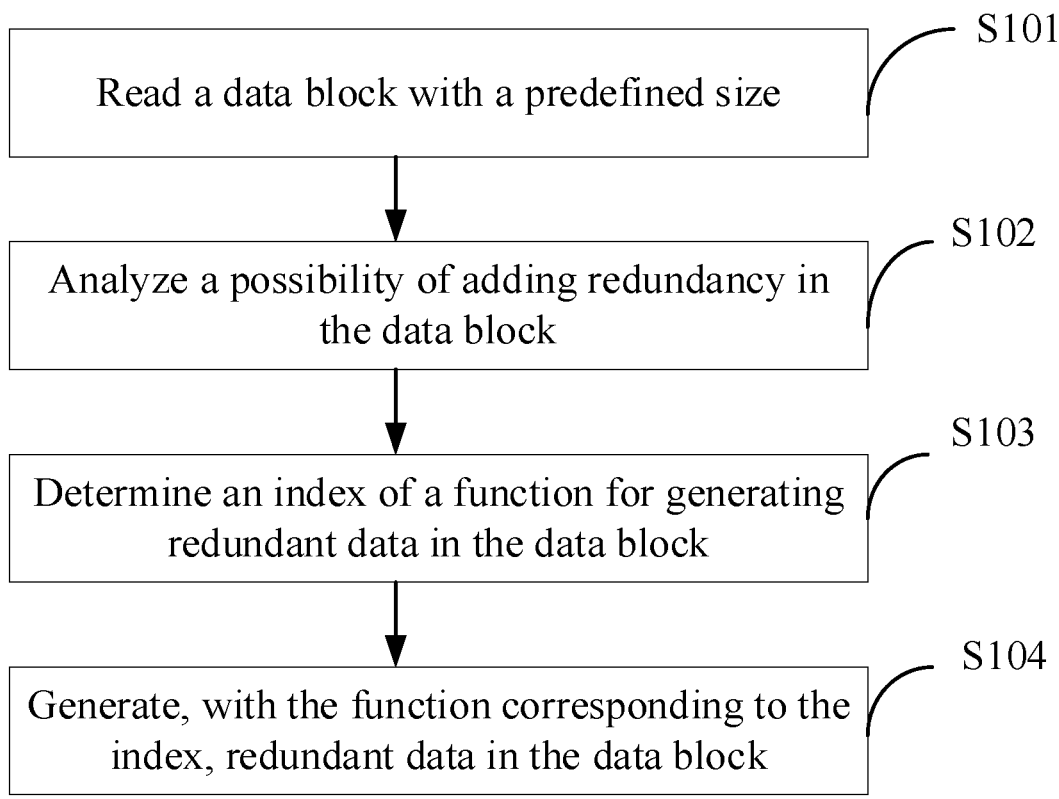
FIG. 1 is a schematic flowchart illustrating a method for training a data compression model provided in implementations of the disclosure.

FIG. 1 is a schematic flowchart illustrating a method for training a data compression model provided in implementations of the disclosure. As illustrated in FIG. 1, the method includes the following.

S101, a data block with a predefined size is read.

S102, a possibility of adding redundancy in the data block is analyzed.

S103, an index of a function for generating redundant data in the data block is determined.

S104, redundant data is generated, with the function corresponding to the index, in the data block.

Redundancy is generated by operating on a data block with a redundancy generator algorithm (RGA), the operating will increase the number of duplicate values in a certain data block. Different from traditional compression algorithms that directly address redundant data, the RGA can create as many redundant data blocks as possible.

The general purpose of the RGA is to hand over data to other compression algorithms for such matter, to provide a compression ratio that exceeds an existing possibility. The RGA can read specific data blocks of any size, and analyze the possibility of adding redundancy in several small data blocks.

The RGA can determine how to create more redundant data in a given data block by utilizing a list of basic mathematical formulas and advanced mathematical formulas.

Data stored in this stage has the following characteristics.
A) RGA data type: the RGA data type is a digit between 0 and 8 (3 bits), and indicates how redundancy is created in a given data block. The larger the digit, the more redundancy the RGA generates in a data block corresponding to the digit.
B) heatmap: the heatmap is actually a heatmap-like map that shows redundancy created between regions of a given data block. For example, in a given data block, the RGA can detect a digit with a length of n bits, which has more redundancy than a digit with a length of m bits. As such, a heatmap with more redundant high-value digits in the data block can be generated.
C) an index of an RGA function for generating redundancy in a given data block is shown in Table 1 below.

| Function name | Index |
|---|---|
| Bernoulli number Bn | 0 |
| Euler's number | 1 |
| Riemann ζ function or Euler-Riemann ζ function, ζ(s) | 2 |
| Gamma function | 3 |
| Multi-order function m | 4 |
| Poly-logarithm | 5 |
| Binomial coefficient | 6 |
| Fibonacci sequence | 7 |
| Factorial | 8 |
| Primization | 9 |
| Greatest common divisor (GCD) | 10 |
| Least common multiple (LCM) | 11 |

A correspondence relationship between the RGA function for generating redundancy and the index of the RGA function is not limited to Table 1, and the correspondence relationship is not limited in the disclosure. In addition, Table 1 may contain more RGA functions.
D) data storage: redundant data can be stored in an actual data block when necessary. The vitality for a stored actual data block is determined by an artificial intelligence (AI) algorithm, where the AI algorithm scans previously recorded data corresponding to the RGA to check if the actual data block inputted increases the RGA inventory.

According to the method for training the data compression model provided in the disclosure, different from traditional compression algorithms that directly address redundant data, by analyzing the possibility of adding redundancy in the data block and generating redundant data in the data block with a corresponding compression algorithm, a compression ratio that exceeds an existing possibility can be obtained, and the compression performance can be improved.

Figure 2:
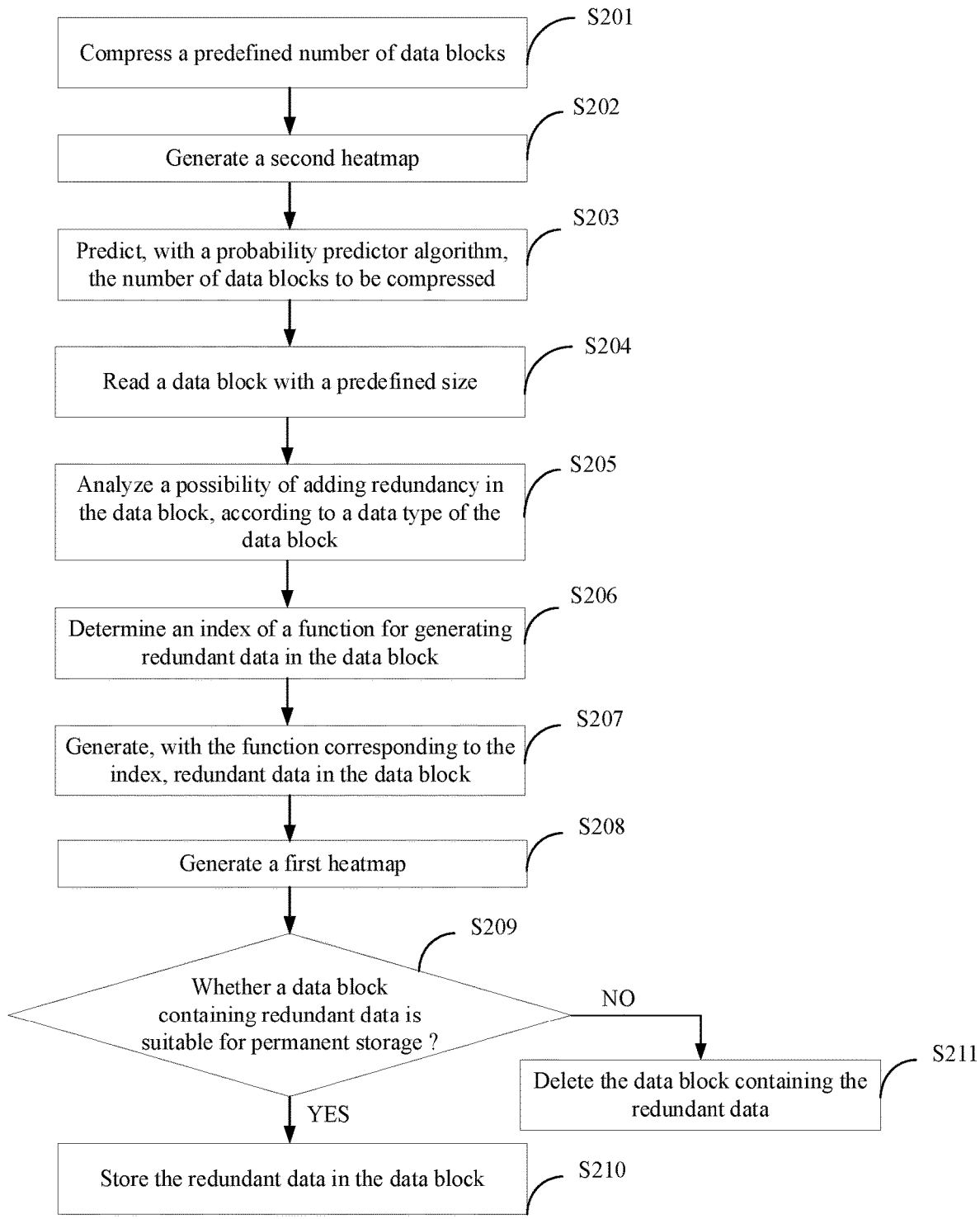
FIG. 2 is a schematic flowchart illustrating a method for training a data compression model provided in other implementations of the disclosure.

As illustrated in FIG. 2, FIG. 2 is a schematic flowchart illustrating a method for training a data compression model provided in other implementations of the disclosure.

Model training records compression processes in various ways. The final purpose of model training is to improve the overall performance and ratio of the entire compression and decompression process of the trained model.

Figure 3:
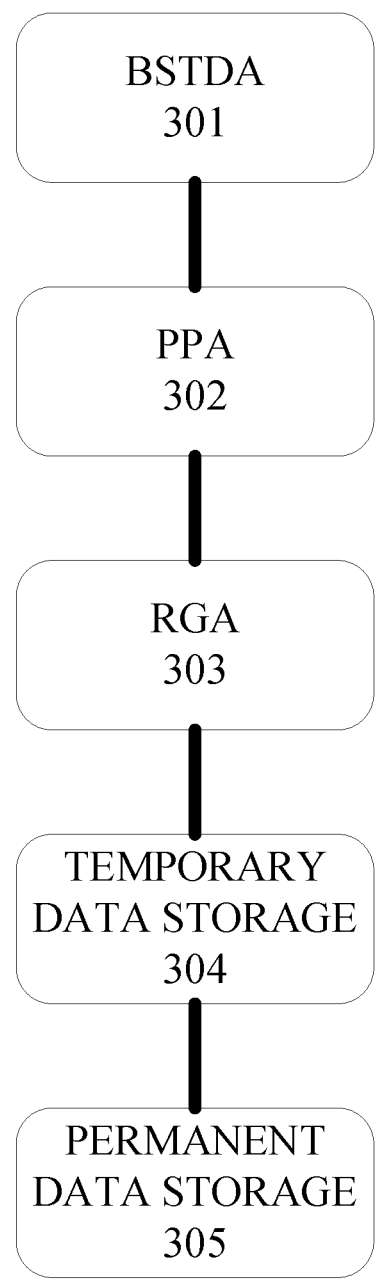
FIG. 3 is a schematic diagram illustrating a system for training a data compression model provided in implementations of the disclosure.

The method can be applied to a system for training a data compression model illustrated in FIG. 3, and the system includes:
1. a bulk same-type data analyzer (BSTDA) 301;
2. a probability predictor algorithm (PPA) 302;
3. an RGA 303;
4. temporary data storage (cache) 304; and
5. permanent data storage 305.

Specifically, the method includes the following.

S201, a predefined number (that is, quantity, how many) of data blocks are compressed, where the data blocks come from one or more files.

S202, a second heatmap is generated, where the second heatmap contains high-value digits with a length of n bits in the data blocks, n<m, and n is a positive integer.

Specifically, the predefined number of data blocks can be compressed with the BSTDA, and the second heatmap can be generated. The BSTDA is an algorithm that applies the RGA and the PPA on a large amount of data blocks rather than on a piece of certain data, where each data block in the large amount of data blocks belongs to an independent or non-independent file.

Different from traditional compression technologies where each operation is performed on one file, the BSTDA tends to study, analyze, and train on a large amount of files in the same specific form.

The BSTDA is more useful in terms of dealing with compression of a large amount of data and big data, which can greatly improve compression efficiency.

Data from the BSTDA represents data from files of the same type will have the same compression parameters.

Data stored in this stage has the following characteristics.
A) data type, that is, data from bitmap (BMP) files.
B) index, that is, each index data/value in a file form.
C) second heatmap, the second heatmap is actually a heatmap-like map that shows the concentration of a given value (binary or hexadecimal) normally distributed in files of the same file format. For example, the BSTDA can detect high-value digits with a length of n bits more concentrated at the beginning of most .mp4 files (excluding their header files). This will generate a heatmap with denser high-value digits at the beginning of a data block.
D) data storage: input data can be stored in an actual data block when necessary. The vitality for a stored actual data block is determined by an AI algorithm, where the AI algorithm scans previously recorded data corresponding to the BSTDA to check if the actual data block inputted increases the BSTDA inventory.

S203, the number of data blocks to be compressed is predicted with a PPA.

Specifically, the number of data blocks to be compressed can be predicted with the PPA.

The PPA is an algorithm that predicts how many data blocks are likely to be compressed using the RGA, as a new training mode, it uses a series of large-length variables and stores its findings as next input data.

The PPA is like a living organism that monitors an input data block and adds knowledge of how the data block can perform better next time. The main purpose of the PPA is to ensure that a computer consumes less time and fewer resources next time the data is compressed.

Data stored in this stage has the following characteristics.

A) PPA data type: the PPA data type is a digit between 0 and 8 (3 bits), and indicates how good the probability prediction for a given data block is. The larger the digit, the better the probability prediction for a data block corresponding to the digit by the PPA.

B) data storage: input data can be stored in an actual data block when necessary. The vitality for a stored actual data block is determined by an AI algorithm, where the AI algorithm scans previously recorded data corresponding to the PPA to check if the actual data block inputted increases the PPA inventory.

S204, a data block with a predefined size is read.

S205, a possibility of adding redundancy in the data block is analyzed according to a data type of the data block.

S206, an index of a function for generating redundant data in the data block is determined.

S207, redundant data is generated, with the function corresponding to the index, in the data block.

S208, a first heatmap is generated, where the first heatmap contains redundant high-value digits with a length of m bits in the data block, and m is a positive integer.

Redundancy is generated by operating on a data block with the RGA, the operating will increase the number of duplicate values in a certain data block. Different from traditional compression algorithms that directly address redundant data, the RGA can create as many redundant data blocks as possible.

The general purpose of the RGA is to hand over data to other compression algorithms for such matter, to provide a compression ratio that exceeds an existing possibility. The RGA can read specific data blocks of any size, and analyze the possibility of adding redundancy in several small data blocks.

The RGA can determine how to create more redundant data in a given data block by utilizing a list of basic mathematical formulas and advanced mathematical formulas.

Data stored in this stage has the following characteristics.

A) RGA data type: the RGA data type is a digit between 0 and 8 (3 bits), and indicates how good redundancy is created in a given data block. The larger the digit, the more redundancy the RGA generates in a data block corresponding to the digit.

B) first heatmap: the first heatmap is actually a heatmap-like map that shows redundancy created between regions of a given data block. For example, in a given data block, the RGA can detect a digit with a length of n bits, which has more redundancy than a digit with a length of m bits. As such, a heatmap with more redundant high-value digits in the data block can be generated.

C) an index of an RGA function for generating redundancy in a given data block is shown in Table 1 above.

The correspondence relationship between the RGA function for generating redundancy and the index of the RGA function is not limited to Table 1, and the correspondence relationship is not limited in the disclosure. In addition, Table 1 may contain more RGA functions.

D) data storage: redundant data can be stored in an actual data block when necessary. The vitality for a stored actual data block is determined by an AI algorithm, where the AI algorithm scans previously recorded data corresponding to the RGA to check if the actual data block inputted increases the RGA inventory.

S209, whether a data block containing redundant data is suitable for permanent storage is detected. If the data block containing the redundant data is suitable for permanent storage, proceed to the operation at S210. If the data block containing the redundant data is not suitable for permanent storage, proceed to the operation at S211.

S210, the redundant data is stored in the data block.

A permanent data storage section is used to store data in a data storage section for the BSTDA, the PPA, and the RGA, and stores data determined by an AI driven algorithm.

This data is used to save a record of actual data to complete a next compression process by a set of compression algorithms described in the disclosure.

S211, the data block containing the redundant data is deleted.

A temporary data storage (cache) section is used to store data that needs to be analyzed and then converted to other values. As described in the data storage chapters of the BSTDA, the PPA, and the RGA, whether actual data is more suitable for storage is detected with the AI algorithm. If it is determined that the actual data is not stored, the actual data should be deleted.

Whether data should be stored permanently is determined with the AI driven algorithm, temporary data storage (cache) is where the AI driven algorithm and other algorithms related to compression technology store and analyze actual data.

The compression algorithm described in the disclosure may exist in parallel with other compression algorithms, or may be performed in whole or in part, depending on input data. This compression algorithm is designed to provide high-ratio compression of a data block(s).

According to the method for training the data compression model provided in the disclosure, different from traditional compression algorithms that directly address redundant data, by analyzing the possibility of adding redundancy in the data block and generating redundant data in the data block with a corresponding compression algorithm, a compression ratio that exceeds an existing possibility can be obtained, and the compression performance can be improved.

By compressing a large amount of data or big data, compression efficiency can be improved.

It can be understood that, in order to realize the functions in the foregoing implementations, an apparatus for training a data compression model includes corresponding hardware structures and/or software modules that realize each of the functions. Those skilled in the art can easily realize that the units and method operations in each example described in conjunction with the implementations disclosed in the disclosure can be implemented in the form of hardware or a combination of hardware and computer software. Whether a certain function is implemented by hardware or computer software driving hardware depends on the specific application scenarios and design constraints of the technical solutions.

Figure 4:
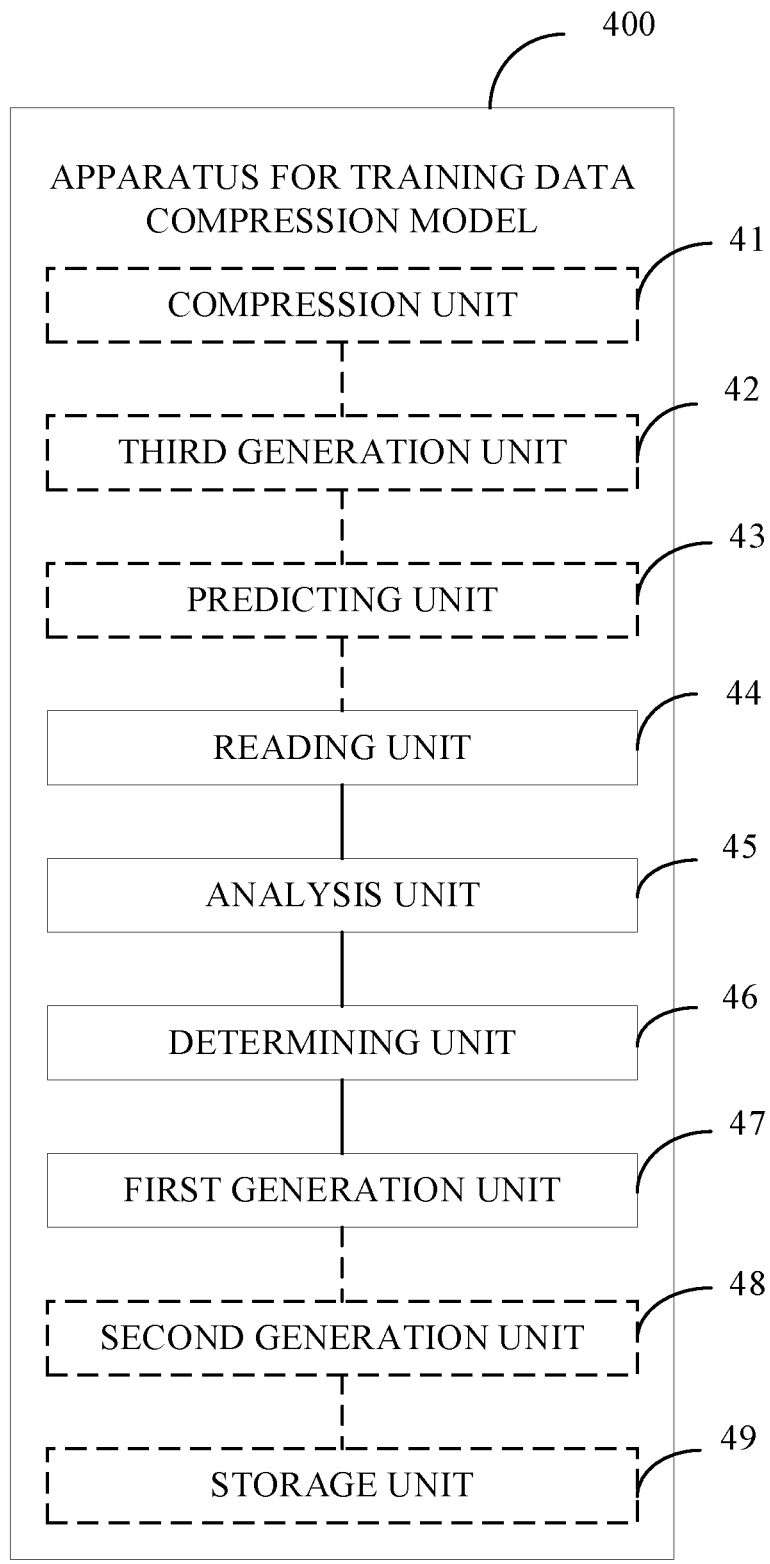
FIG. 4 is a schematic structural diagram illustrating an apparatus for training a data compression model provided in implementations of the disclosure.

As illustrated in FIG. 4, FIG. 4 is a schematic structural diagram illustrating an apparatus for training a data compression model provided in the disclosure. An apparatus 400 for training a data compression model includes a reading unit 44, an analysis unit 45, a determining unit 46, and a first generation unit 47. The reading unit 44 is configured to read a data block with a predefined size. The analysis unit 45 is configured to analyze a possibility of adding redundancy in the data block. The determining unit 46 is configured to determine an index of a function for generating redundant data in the data block. The first generation unit 47 is configured to generate, with the function corresponding to the index, redundant data in the data block.

In a possible implementation, the analysis unit 45 configured to analyze the possibility of adding redundancy in the data block is configured to analyze, according to a data type of the data block, the possibility of adding redundancy in the data block.

In another possible implementation, the apparatus further includes a second generation unit 48. The second generation unit 48 is configured to generate a first heatmap, where the first heatmap contains redundant high-value digits with a length of m bits in the data block, and m is a positive integer.

In another possible implementation, the apparatus further includes a storage unit 49. The storage unit 49 is configured to store the redundant data in the data block.

In another possible implementation, the apparatus further includes a predicting unit 43. The predicting unit 43 is configured to predict, with a PPA, the number of data blocks to be compressed.

In another possible implementation, the apparatus further includes a compression unit 41 and a third generation unit 42. The compression unit 41 is configured to compress a predefined number of data blocks, where the data blocks come from one or more files. The third generation unit 42 is configured to generate a second heatmap, where the second heatmap contains high-value digits with a length of n bits in the data blocks, n<m, and n is a positive integer.

In another possible implementation, the storage unit 49 is further configured to delete a data block containing redundant data, in response to detecting that the data block containing the redundant data is not suitable for permanent storage.

For the specific implementation of each of the above units, reference can be made to the corresponding descriptions in FIG. 1 to FIG. 3, which will not be repeated herein.

The compression unit 41, the third generation unit 42, the predicting unit 43, the second generation unit 48, and the storage unit 49 are optional units, and are represented and connected through dotted lines in FIG. 4.

It should be noted that, the above units or one or more of the above units can be implemented by software, hardware, or a combination of software and hardware. When any of the above units or the above units is implemented in software, said software is in the form of computer program instructions and is stored in the memory. A processor can be configured to execute the program instructions to implement the above method flow. The processor may be built into a system on chip (SoC) or an application specific integrated circuit (ASIC), or may be an independent semiconductor chip. In addition to a core used to execute software instructions for calculation or processing, the processor may further include a necessary hardware accelerator, such as a field programmable gate array (FPGA), a programmable logic device (PLD), or a logic circuit that implements dedicated logic operations.

When the above units or the unit are implemented in hardware, said hardware may be a central processing unit (CPU), a microprocessor, a digital signal processing (DSP) chip, a microcontroller unit (MCU), an artificial intelligence processor, an ASIC, an SoC, an FPGA, a PLD, a dedicated digital circuit, a hardware accelerator, a non-integrated discrete device, or one or any combination thereof. The hardware can run necessary software or does not depend on software to implement the above method flow.

According to the apparatus for training the data compression model provided in implementations of the disclosure, different from traditional compression algorithms that directly address redundant data, by analyzing the possibility of adding redundancy in the data block and generating redundant data in the data block with a corresponding compression algorithm, a compression ratio that exceeds an existing possibility can be obtained, and the compression performance can be improved.

Figure 5:
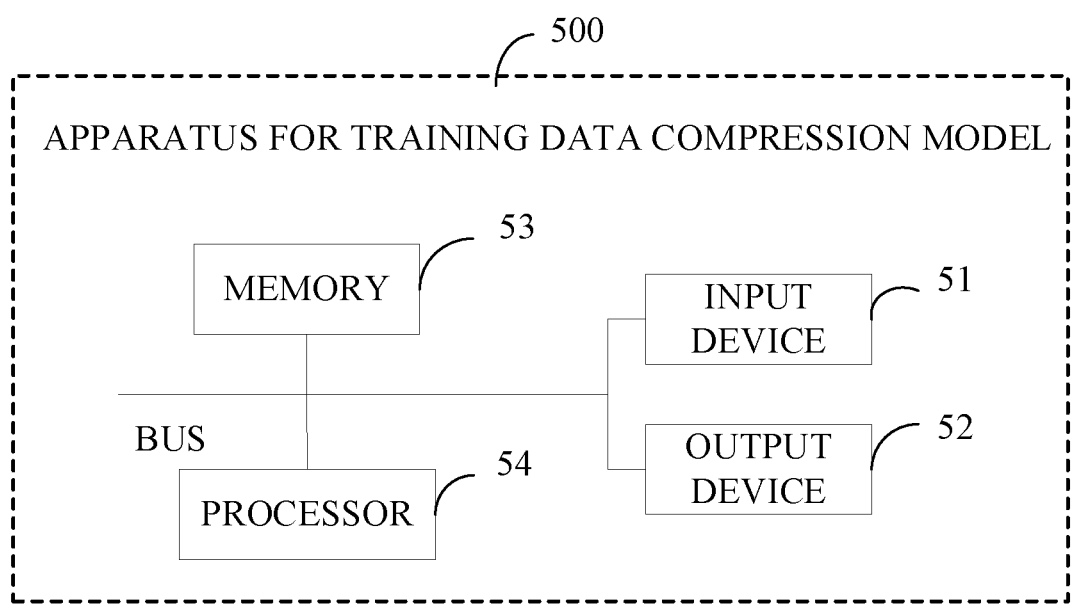
FIG. 5 is a schematic structural diagram illustrating an apparatus for training a data compression model provided in other implementations of the disclosure.

As illustrated in FIG. 5, FIG. 5 is a schematic structural diagram illustrating an apparatus for training a data compression model provided in other implementations of the disclosure. An apparatus 500 for training a data compression model includes an input device 51, an output device 52, a memory 53, and a processor 54 (the apparatus may include one or more processors 54, and one processor is shown as an example in FIG. 5). In some implementations of the disclosure, the input device 51, the output device 52, the memory 53, and the processor 54 may be connected with each other through a bus or other means. In FIG. 5, bus-based connection is shown as an example.

The processor 54 is configured to: read a data block with a predefined size; analyze a possibility of adding redundancy in the data block; determine an index of a function for generating redundant data in the data block; and generate, with the function corresponding to the index, redundant data in the data block.

In a possible implementation, the processor 54 configured to analyze the possibility of adding redundancy in the data block is configured to: analyze, according to a data type of the data block, the possibility of adding redundancy in the data block.

In another possible implementation, the processor 54 is further configured to generate a first heatmap, where the first heatmap contains redundant high-value digits with a length of m bits in the data block, and m is a positive integer.

In another possible implementation, the processor 54 is further configured to store the redundant data in the data block.

In another possible implementation, the processor 54 is further configured to predict, with a PPA, the number of data blocks to be compressed.

In another possible implementation, the processor 54 is further configured to: compress a predefined number of data blocks, where the data blocks come from one or more files; and generate a second heatmap, where the second heatmap contains high-value digits with a length of n bits in the data blocks, n<m, and n is a positive integer.

In another possible implementation, the processor 54 is further configured to delete a data block containing redundant data, in response to detecting that the data block containing the redundant data is not suitable for permanent storage.

It can be understood that, the processor in implementations of the disclosure may be a CPU, or may also be other general-purpose processors, DSPs, ASICs, FPGAs or other programmable logic devices, transistor logic devices, hardware components or any combination thereof. The general-purpose processor may be a microprocessor or any conventional processor.

According to the apparatus for training the data compression model provided in implementations of the disclosure, different from traditional compression algorithms that directly address redundant data, by analyzing the possibility of adding redundancy in the data block and generating redundant data in the data block with a corresponding compression algorithm, a compression ratio that exceeds an existing possibility can be obtained, and the compression performance can be improved.

Implementations of the disclosure further provide a non-transitory computer-readable storage medium. The non-transitory computer-readable storage medium stores computer programs which, when executed by a processor, cause the processor to execute the method flow illustrated in FIG. 1 and FIG. 2.

The method operations in the implementations of the disclosure can be implemented in hardware or in a manner of a processor executing software instructions. The software instructions can be composed of corresponding software modules, and the software modules can be stored in a random-access memory (RAM), a flash memory, a read-only memory (ROM), a programmable ROM, an erasable programmable ROM, an electrically erasable programmable ROM, a register, a hard disk, a mobile hard disk, a CD-ROM, or any other form of storage medium well known in the art. An exemplary storage medium is coupled with a processor, so that the processor can read information from the storage medium and write information into the storage medium. Of course, the storage medium may also be an integral part of the processor. The processor and the storage medium may be located in an ASIC. Moreover, the ASIC may be located in a data compression device. Of course, the processor and the storage medium may also exist as discrete components in the data compression device.

The foregoing implementations may be implemented in whole or in part by software, hardware, firmware, or any combination thereof. When implemented by software, the foregoing implementations may be implemented in whole or in part in the form of a computer program product. The computer program product includes one or more computer programs or instructions. The computer programs or instructions, when loaded and executed on a computer, execute all or part of processes or functions described in the implementations of the disclosure. The computer may be a general-purpose computer, a special-purpose computer, a computer network, a base station, a user equipment (UE), or other programmable device. The computer programs or instructions may be stored in a computer-readable storage medium, or transmitted from a computer-readable storage medium to another computer-readable storage medium. As an example, the computer programs or instructions may be transmitted in a wired or wireless manner from a website, computer, server, or data center to another website site, computer, server, or data center. The computer-readable storage medium may be any available medium that can be accessed by a computer or a data storage device such as a server or a data center that integrates one or more available media. The available medium may be a magnetic medium such as a floppy disk, a hard disk, and a tape, may also be an optical medium such as a digital video optical disk, or may also be a semiconductor medium such as a solid-state hard drive.

In the various implementations of the disclosure, if there is no special explanation or logical conflict, the terms and/or descriptions between different implementations are consistent and can be referenced to each other. The technical features in different implementations may be combined to form new implementations based on their inherent logical relationships.

It should be understood that, in the description of the disclosure, unless otherwise stated, the character "/" indicates that associated objects before and after the character are in an "or" relationship. For example, A/B means A or B, where A and B can be singular or plural. Furthermore, in the description of the disclosure, unless otherwise specified, the term "plurality/multiple" means two or more than two. The expression "at least one of the following items" or similar expressions refer to any combination of these items, including any combination of the items in singular form or the items in plural form. For example, "at least one of a, b, or c" means: a, b, c, a-b, a-c, b-c, or a-b-c, where a, b, c can be in singular form or in plural form. In addition, in order to facilitate a clear description of the technical solutions of the implementations of the disclosure, in the implementations of the disclosure, the terms such as "first" and "second" are used to distinguish identical or similar items with basically the same functions and effects. Those skilled in the art can understand that the terms such as "first" and "second" do not limit the quantity and execution order, and do not necessarily refer to different objects. Moreover, in the implementations of the disclosure, the terms such as "exemplary", "for example/instance/such as" are used to indicate serving as an example, illustration, or explanation. Any implementation or design described as "exemplary" or "for example/instance/such as" in the implementations of the disclosure should not be construed as preferred or advantageous over other implementations or designs. Rather, the use of the terms such as "exemplary" or "for example/instance/such as" is intended to present related concepts in a concrete manner to facilitate understanding.

The disclosure provides a method and an apparatus for training a data compression model, and a storage medium, to provide high-ratio compression of a data block(s).

In a first aspect, a method for training a data compression model is provided. The method includes: reading a data block with a predefined size; analyzing a possibility of adding redundancy in the data block; determining an index of a function for generating redundant data in the data block; and generating, with the function corresponding to the index, redundant data in the data block.

In a possible implementation, analyzing the possibility of adding redundancy in the data block includes: analyzing the possibility of adding redundancy in the data block, according to a data type of the data block.

In another possible implementation, the method further includes: generating a first heatmap, where the first heatmap contains redundant high-value digits with a length of m bits in the data block, and m is a positive integer.

In another possible implementation, the method further includes: storing the redundant data in the data block.

In another possible implementation, the method further includes: predicting, with a PPA, the number of data blocks to be compressed.

In another possible implementation, the method further includes: compressing a predefined number of data blocks, where the data blocks come from one or more files; and generating a second heatmap, where the second heatmap contains high-value digits with a length of n bits in the data blocks, n<m, and n is a positive integer.

In another possible implementation, the method further includes: deleting a data block containing redundant data, in response to detecting that the data block containing the redundant data is not suitable for permanent storage.

In a second aspect, an apparatus for training a data compression model is provided. The apparatus includes a reading unit, an analysis unit, a determining unit, and a first generation unit. The reading unit is configured to read a data block with a predefined size. The analysis unit is configured to analyze a possibility of adding redundancy in the data block. The determining unit is configured to determine an index of a function for generating redundant data in the data block. The first generation unit is configured to generate, with the function corresponding to the index, redundant data in the data block.

In a possible implementation, the analysis unit configured to analyze the possibility of adding redundancy in the data block is configured to analyze, according to a data type of the data block, the possibility of adding redundancy in the data block.

In another possible implementation, the apparatus further includes a second generation unit. The second generation unit is configured to generate a first heatmap, where the first heatmap contains redundant high-value digits with a length of m bits in the data block, and m is a positive integer.

In another possible implementation, the apparatus further includes a storage unit. The storage unit is configured to store the redundant data in the data block.

In another possible implementation, the apparatus further includes a predicting unit. The predicting unit is configured to predict, with a PPA, the number of data blocks to be compressed.

In another possible implementation, the apparatus further includes a compression unit and a third generation unit. The compression unit is configured to compress a predefined number of data blocks, where the data blocks come from one or more files. The third generation unit is configured to generate a second heatmap, where the second heatmap contains high-value digits with a length of n bits in the data blocks, n<m, and n is a positive integer.

In another possible implementation, the storage unit is further configured to delete a data block containing redundant data, in response to detecting that the data block containing the redundant data is not suitable for permanent storage.

In a third aspect, an apparatus for training a data compression model is provided. The apparatus includes a memory, a processor, and computer programs. The computer programs are stored in the memory and executable on the processor. The computer programs, when executed by the processor, are operable to execute the method in the first aspect or any implementation of the first aspect.

In a fourth aspect, a computer-readable storage medium is provided. The computer-readable storage medium stores computer programs which, when executed by a processor, are operable to execute the method in the first aspect or any implementation of the first aspect.

Advantageous effects of the solution for training the data compression model of the disclosure lie in that: different from traditional compression algorithms that directly address redundant data, by analyzing the possibility of adding redundancy in the data block and generating redundant data in the data block with a corresponding compression algorithm, a compression ratio that exceeds an existing possibility can be obtained, and the compression performance can be improved.

It can be understood that, the various numerical numbers involved in the implementations of the disclosure are only for convenience of description and are not used to limit the scope of the implementations of the disclosure. The serial numbers of the above processes do not mean the execution order. The execution order of various processes should be determined according to their functions and internal logic.

What is claimed is:

1. A method for training a data compression model, performed by a processor and comprising:
reading a data block with a predefined size;
analyzing a possibility of creating redundancy in the data block;
determining an index of a function for generating redundant data in the data block; and
generating, with the function corresponding to the index, the redundant data in the data block, wherein the redundant data is for compression of the data block.

2. The method of claim 1, wherein analyzing the possibility of creating redundancy in the data block comprises:
analyzing, according to a redundancy generator algorithm (RGA) data type for the data block, the possibility of creating redundancy in the data block, wherein the RGA data type is a digit ranging from 0 to 8, and indicates how good redundancy is created in the data block; the larger the digit, the more redundancy the RGA generates in a data block corresponding to the digit.

3. The method of claim 1, further comprising:
generating a first heatmap according to the data block together with the redundant data, wherein the first heatmap shows redundancy being created among regions of the data block, and contains a digit with a length of n bits and a digit with a length of m bits in the data block, the digit with the length of n bits has more redundancy than the digit with the length of m bits, the digit with the length of m bits corresponds to a high-value, n<m, and n and m are positive integers.

4. The method of claim 1, wherein before reading the data block with the predefined size, the method further comprises:
predicting, with a probability predictor algorithm (PPA), a number of data blocks to be compressed.

5. The method of claim 1, wherein before reading the data block with the predefined size, the method further comprises:
compressing, with a bulk same-type data analyzer (BSTDA), a predefined number of data blocks, wherein the predefined number of the data blocks come from one or more files of a same file form; and
generating a second heatmap according to the predefined number of data blocks, wherein the second heatmap shows concentration of digits in the one or more files of the same file format, and contains digits with a length of n bits in the data blocks, the digits with the length of n bits are denser than other digits in the data blocks, the digits with the length of n bits correspond to a high-value, and n is a positive integer.

6. The method of claim 1, further comprising:
deleting a data block containing the redundant data, in response to detecting that the data block containing the redundant data is not suitable for permanent storage.

7. An apparatus for training a data compression model, comprising:
a memory;
a processor, coupled with the memory; and
computer programs, stored in the memory and executable on the processor;
the computer programs, when executed by the processor, being operable to:
read a data block with a predefined size;
analyze a possibility of creating redundancy in the data block;
determine an index of a function for generating redundant data in the data block; and
generate, with the function corresponding to the index, the redundant data in the data block, wherein the redundant data is for compression of the data block.

8. The apparatus of claim 7, wherein the processor configured to analyze the possibility of creating redundancy in the data block is configured to:
  analyze, according to a redundancy generator algorithm (RGA) data type for the data block, the possibility of creating redundancy in the data block, wherein the RGA data type is a digit ranging from 0 to 8, and indicates how good redundancy is created in the data block; the larger the digit, the more redundancy the RGA generates in a data block corresponding to the digit.

9. The apparatus of claim 7, wherein the processor is further configured to:
  generate a first heatmap according to the data block together with the redundant data, wherein the first heatmap shows redundancy being created among regions of the data block, and contains a digit with a length of n bits and a digit with a length of m bits in the data block, the digit with the length of n bits has more redundancy than the digit with the length of m bits, the digit with the length of m bits corresponds to a high-value, n<m, and n and m are positive integers.

10. The apparatus of claim 7, wherein before reading the data block with the predefined size, the processor is further configured to:
  predict, with a probability predictor algorithm (PPA), a number of data blocks to be compressed.

11. The apparatus of claim 7, wherein before reading the data block with the predefined size, the processor is further configured to:
  compress, with a bulk same-type data analyzer (BSTDA), a predefined number of data blocks, wherein the predefined number of the data blocks come from one or more files of a same file form; and
  generate a second heatmap according to the predefined number of data blocks, wherein the second heatmap shows concentration of digits in the one or more files of the same file format, and contains digits with a length of n bits in the data blocks, the digits with the length of n bits are denser than other digits in the data blocks, the digits with the length of n bits correspond to a high-value, and n is a positive integer.

12. The apparatus of claim 7, wherein the processor is further configured to:
  delete a data block containing the redundant data, in response to detecting that the data block containing the redundant data is not suitable for permanent storage.

13. A non-transitory computer-readable storage medium storing computer programs which, when executed by a processor, cause the processor to carry out actions, comprising:
  reading a data block with a predefined size;
  analyzing a possibility of creating redundancy in the data block;
  determining an index of a function for generating redundant data in the data block; and
  generating, with the function corresponding to the index, the redundant data in the data block, wherein the redundant data is for compression of the data block.

14. The non-transitory computer-readable storage medium of claim 13, wherein the computer programs executed by the processor to carry out actions of analyzing the possibility of creating redundancy in the data block are executed by the processor to carry out actions, comprising:
  analyzing, according to a redundancy generator algorithm (RGA) data type for the data block, the possibility of creating redundancy in the data block, wherein the RGA data type is a digit ranging from 0 to 8, and indicates how good redundancy is created in the data block; the larger the digit, the more redundancy the RGA generates in a data block corresponding to the digit.

15. The non-transitory computer-readable storage medium of claim 13, wherein the computer programs are further executed by the processor to carry out actions, comprising:
  generating a first heatmap according to the data block together with the redundant data, wherein the first heatmap shows redundancy being created among regions of the data block, and contains a digit with a length of n bits and a digit with a length of m bits in the data block, the digit with the length of n bits has more redundancy than the digit with the length of m bits, the digit with the length of m bits corresponds to a high-value, n<m, and n and m are positive integers.

16. The non-transitory computer-readable storage medium of claim 13, wherein before reading the data block with the predefined size, the computer programs are further executed by the processor to carry out actions, comprising:
  predicting, with a probability predictor algorithm (PPA), a number of data blocks to be compressed.

17. The non-transitory computer-readable storage medium of claim 13, wherein before reading the data block with the predefined size, the computer programs are further executed by the processor to carry out actions, comprising:
  compressing, with a bulk same-type data analyzer (BSTDA), a predefined number of data blocks, wherein the predefined number of the data blocks come from one or more files of a same file form; and
  generating a second heatmap according to the predefined number of data blocks, wherein the second heatmap shows concentration of digits in the one or more files of the same file format, and contains digits with a length of n bits in the data blocks, the digits with the length of n bits are denser than other digits in the data blocks, the digits with the length of n bits correspond to a high-value, and n is a positive integer.

18. The non-transitory computer-readable storage medium of claim 13, wherein the computer programs are further executed by the processor to carry out actions, comprising:
  deleting a data block containing the redundant data, in response to detecting that the data block containing the redundant data is not suitable for permanent storage.

* * * * *